(No Model.)

A. C. LATTA.
GEAR FOR TRICYCLES.

No. 331,644. Patented Dec. 1, 1885.

Witnesses.
Theo. L. Popp
Chas. J. Buchheit

A. C. Latta Inventor
By Wilhelm & Bonner
Attorneys

N. PETERS, Photo-Lithographer, Washington, D. C.

UNITED STATES PATENT OFFICE.

ADRIAN C. LATTA, OF FRIENDSHIP, NEW YORK.

GEAR FOR TRICYCLES.

SPECIFICATION forming part of Letters Patent No. 331,644, dated December 1, 1885.

Application filed February 19, 1885. Serial No. 156,332. (No model.)

*To all whom it may concern:*

Be it known that I, ADRIAN C. LATTA, of Friendship, in the county of Allegany and State of New York, have invented new and useful Improvements in Differential Gear for Tricycles, of which the following is a specification.

This invention relates to an improvement in the driving mechanism of tricycles, and has for its object to produce a driving-gear of simple construction which will permit both wheels to be driven with equal speed when the machine is driven on a straight course, and which will permit the wheels to run with unequal speeds when the machine is driven on an irregular course.

My invention consists to that end of the improvements in the driving mechanism which will be hereinafter fully set forth, and pointed out in the claims.

Figure 1:
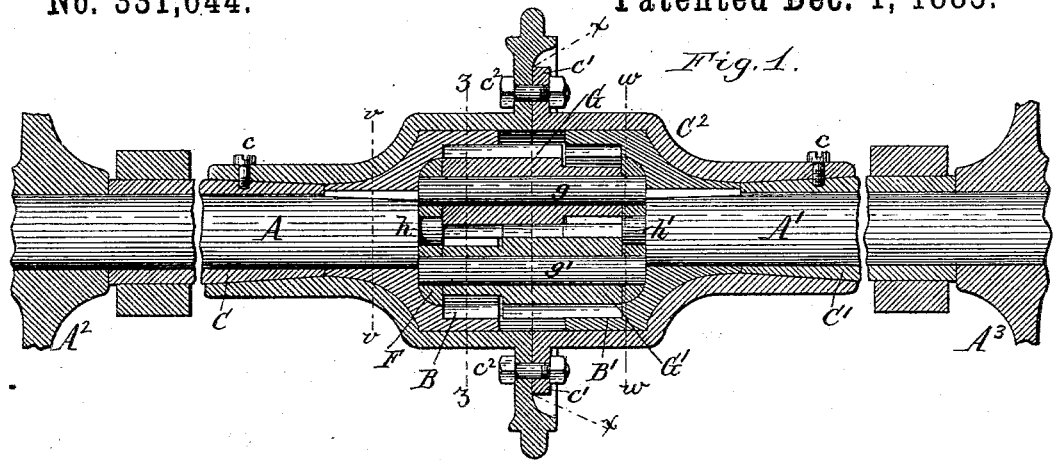
Figure 2:
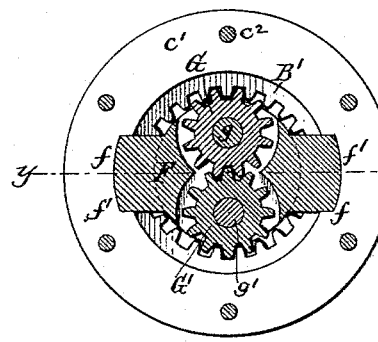
Figure 3:
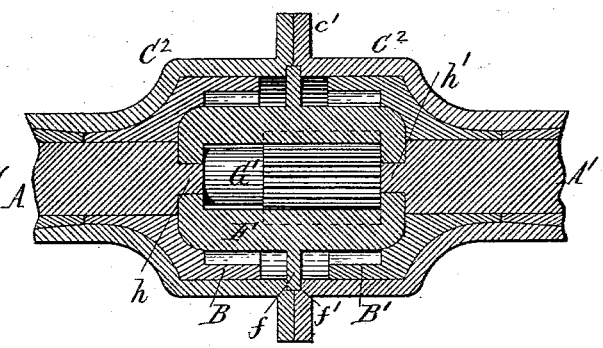
Figure 4:
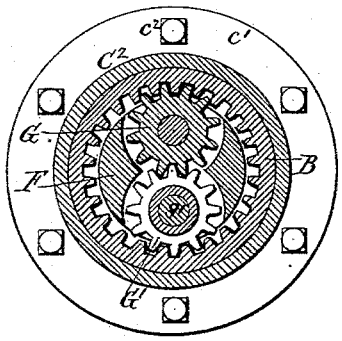
Figure 6:
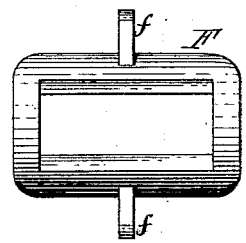
Figure 5:
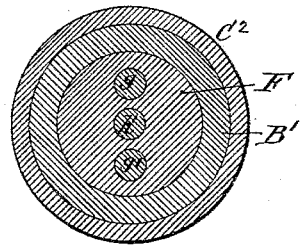
Figure 7:
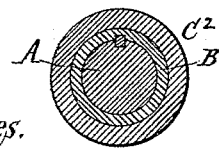

In the accompanying drawings, Figure 1 is a longitudinal section of my improved driving mechanism. Fig. 2 is a cross-section in line $x\ x$, Fig. 1. Fig. 3 is a horizontal section in line $y\ y$, Fig. 2. Fig. 4 is a cross-section in line $z\ z$, Fig. 1. Fig. 5 is a cross-section in line $w\ w$, Fig. 1. Fig. 6 is a top plan view of the frame in which the pinions are journaled. Fig. 7 is a cross-section in line $v\ v$, Fig. 1.

Like letters of reference refer to like parts in the several figures.

A A' represent the two parts of the axle, and $A^2$ $A^3$ the hubs of the driving-wheels rigidly secured to the same. B B' represent two internally-toothed gear-wheels secured, respectively, to the inner ends of the parts A A' of the axle, so as to turn with the same, and the driving-wheels secured thereto.

C C' represent tubes or sleeves surrounding the portions A A' of the axle and turning loosely on the same.

$C^2$ represents a cylindrical casing which incloses the gear-wheels B B', and which is secured to the inner ends of the tubes C C' by screws $c$ or other suitable means, so as to turn with said tubes. The casing $C^2$ is made in two parts, which are jointed together at the middle of the casing by flanges $c'$ and bolts $c^2$. The outer ends of the sleeves C C' are supported in bearings D, which are of any ordinary and suitable construction, and which are attached to the frame of the machine.

E represents the sprocket wheel or pulley, which receives the power from the pedals, and which is secured to the casing $C^2$, as represented in Fig. 1, or to any part which is secured to said casing.

F represents a frame arranged within the casing $C^2$, and provided with wings $f$, which are seated in recesses $f'$, formed in the casing, whereby the latter is held in the casing and compelled to turn with the same.

G G' represent two pinions, which are arranged parallel with the axle in the casing $C^2$, and mounted, respectively, upon journal-pins $g\ g'$, which are attached with their ends to the frame F. The inner portions of the two pinions G G' mesh with each other, and the outer portion of the pinion G meshes with the gear-wheel B, and the outer portion of the pinion G' meshes with the gear-wheel B', while the pinion G does not extend far enough to mesh with the wheel B', nor the pinion G' far enough to mesh with the wheel B, as clearly shown in Fig. 1.

The ends of the frame F are seated in recesses formed in the inner sides of the gear-wheels B B', and are provided with central openings, which receive cylindrical pins or studs $h\ h'$, formed at the inner ends of the portions A A' of the axle. The casing $C^2$ incloses the gear-wheels B B', the pinions G G', and the frame F, and protects these parts against dust, rain, &c. The casing $C^2$ also forms a rigid support for the gear-wheels B B', and the inner ends of the portions A A' of the axle, to which they are secured, thereby holding the two portions of the axle firmly in line with each other.

As the gear-wheels B B' have each a greater number of teeth in contact with the pinions than the latter have with each other, the inner portions of the pinions which engage with each other are preferably made somewhat longer than the portions which engage with the wheels B B', to equalize the strength of the parts.

When the machine is driven on a straight course, the power applied to any part of the sleeves C C' or casing $C^2$ causes the frame F and pinions G G' to revolve with the outer tubular parts, and the pinions, pushing against each other and the wheels B B', cause the parts A A' of the axle and the driving-wheels A² A³ to revolve also, all the parts revolving together, like a solid axle having driving-wheels rigidly secured to its ends.

When the machine is driven on a curve, the outside driving-wheel rotates faster than the inside wheel, and the pinions G G' turn on the journal-pins $g$ $g'$ within the wheels B B', and cause the frame F and the external parts of the axle, which carry the power-supplying wheel E, to rotate with the average speed of the two driving-wheels, so that the outside driving-wheel revolves as much faster than the inside wheel as may be necessary, in order to travel the greater distance through which it has to move.

I claim as my invention—

1. The combination, with the portions A A' of the axle, of an inclosing tubular portion, a driving wheel or pulley secured to said tubular portion, a frame, F, also secured to said tubular portion, pinions G G', journaled in said frame, and gear-wheels B B', secured to the axle portions A A', substantially as set forth.

2. In a differential gear for tricycles, the combination, with the tubular casing C², of the frame F, provided with wings $f$, seated in said casing, and pinions G G', journaled in said frame, substantially as set forth.

3. The combination, with the axle portions A A', provided with gear-wheels B B', of the tubular casing C², inclosing the wheels B B', and provided with a support for the same, a frame, F, secured to said tubular casing, and pinions G G', journaled in said frame, substantially as set forth.

Witness my hand this 5th day of February, 1885.

ADRIAN C. LATTA.

Witnesses:
S. G. LATTA,
S. E. LATTA.